(12) United States Patent
Sharan et al.

(10) Patent No.: US 9,110,515 B2
(45) Date of Patent: Aug. 18, 2015

(54) METHOD AND APPARATUS FOR TEXT INPUT

(75) Inventors: Santosh Sharan, Acton, MA (US);
Mayank Agarwal, Ashland, MA (US);
Gordon Kessler, Mount Kisco, NY (US)

(73) Assignee: Nuance Communications, Inc.,
Burlington, MA (US)

( * ) Notice: Subject to any disclaimer, the term of this patent is extended or adjusted under 35 U.S.C. 154(b) by 1220 days.

(21) Appl. No.: 12/543,602

(22) Filed: Aug. 19, 2009

(65) Prior Publication Data

US 2011/0047456 A1   Feb. 24, 2011

(51) Int. Cl.
| | |
|---|---|
| *G06F 3/023* | (2006.01) |
| *G06F 3/048* | (2013.01) |
| *G06F 17/00* | (2006.01) |
| *G06F 3/042* | (2006.01) |
| *H04N 1/00* | (2006.01) |
| *G06F 17/27* | (2006.01) |

(52) U.S. Cl.
CPC ............ *G06F 3/0237* (2013.01); *G06F 3/0233* (2013.01); *G06F 3/0236* (2013.01); *G06F 3/0426* (2013.01); *G06F 17/276* (2013.01); *H04N 1/00384* (2013.01)

(58) Field of Classification Search
CPC ....... G06F 3/0237; G06F 3/02; G06F 3/0426; H04N 1/00384
USPC .......... 715/261, 256, 200, 773; 708/142, 145, 708/131; 345/160, 168
See application file for complete search history.

(56) References Cited

U.S. PATENT DOCUMENTS

| | | | |
|---|---|---|---|
| 5,050,116 A * | 9/1991 | Stahnke ......................... | 708/145 |
| 5,612,690 A | 3/1997 | Levy et al. | |
| 5,748,512 A | 5/1998 | Vargas | |
| 5,818,437 A | 10/1998 | Grover et al. | |
| 5,864,765 A * | 1/1999 | Barvesten ...................... | 455/565 |
| 5,963,666 A * | 10/1999 | Fujisaki et al. ................ | 382/187 |
| 5,963,671 A | 10/1999 | Comerford et al. | |
| 5,973,622 A * | 10/1999 | Chiang ............................ | 341/22 |
| 6,005,496 A * | 12/1999 | Hargreaves et al. ............ | 341/22 |
| 6,011,554 A | 1/2000 | King et al. | |
| 6,104,384 A | 8/2000 | Moon et al. | |
| 6,184,803 B1 * | 2/2001 | Burrell, IV ...................... | 341/22 |
| 6,286,064 B1 | 9/2001 | King et al. | |
| 6,307,548 B1 | 10/2001 | Flinchem et al. | |
| 6,307,549 B1 | 10/2001 | King et al. | |
| 6,378,234 B1 * | 4/2002 | Luo ................................. | 341/22 |
| 6,445,380 B1 * | 9/2002 | Klein ............................. | 345/168 |

(Continued)

OTHER PUBLICATIONS

KR2006092177, Kim, 2006, English Translation from KIPON.*

(Continued)

*Primary Examiner* — Ece Hur
(74) *Attorney, Agent, or Firm* — Perkins Coie LLP

(57) ABSTRACT

A method and apparatus for text entry are provided. The method provides a keypad comprising four directional keys and a center selection key, and assigns a set of letters to each of the four directional keys. A representation of the set of letters assigned to each of the four directional keys is provided. A sequence of selected directional keys is received in accordance with a user input, and in accordance with the selected directional keys, the set of letters assigned to each of the selected directional keys are selectively passed to a parsing algorithm. The parsing algorithm determines a user intended text input based upon the passed sequence of letter groupings.

22 Claims, 6 Drawing Sheets

(56) References Cited

U.S. PATENT DOCUMENTS

| | | | |
|---|---|---|---|
| 6,765,556 B2* | 7/2004 | Kandogan et al. | 345/168 |
| 6,801,190 B1 | 10/2004 | Robinson et al. | |
| 6,897,849 B2* | 5/2005 | Kim | 345/160 |
| 7,088,345 B2 | 8/2006 | Robinson et al. | |
| 7,098,896 B2* | 8/2006 | Kushler et al. | 345/168 |
| 7,098,919 B2* | 8/2006 | Kim | 345/467 |
| 7,151,530 B2* | 12/2006 | Roeber et al. | 345/168 |
| 7,162,694 B2 | 1/2007 | Venolia | |
| 7,175,438 B2* | 2/2007 | Levy | 434/167 |
| 7,202,853 B2 | 4/2007 | Ng et al. | |
| 7,207,011 B2 | 4/2007 | Mulvey et al. | |
| 7,250,938 B2 | 7/2007 | Kirkland et al. | |
| 7,277,088 B2 | 10/2007 | Robinson et al. | |
| 7,293,231 B1 | 11/2007 | Gunn et al. | |
| 7,320,111 B2* | 1/2008 | Volovitz | 715/827 |
| 7,324,083 B2 | 1/2008 | Fux et al. | |
| 7,380,724 B2* | 6/2008 | Unruh | 235/472.01 |
| 7,430,508 B2 | 9/2008 | Williamson et al. | |
| 7,440,889 B1 | 10/2008 | Skiena et al. | |
| 7,440,896 B2 | 10/2008 | Williamson et al. | |
| 7,453,439 B1* | 11/2008 | Kushler et al. | 345/168 |
| 7,457,466 B2 | 11/2008 | Williamson et al. | |
| 7,475,004 B2 | 1/2009 | Fux et al. | |
| 7,477,238 B2 | 1/2009 | Fux et al. | |
| 7,764,401 B2* | 7/2010 | Miyata | 358/1.9 |
| 7,911,363 B2* | 3/2011 | Jeon | 341/22 |
| 8,185,841 B2* | 5/2012 | Rainisto | 715/773 |
| 8,188,976 B2* | 5/2012 | Suzuki et al. | 345/169 |
| 8,274,410 B2* | 9/2012 | Lassesson et al. | 341/23 |
| 8,521,927 B2* | 8/2013 | Hirshberg | 710/67 |
| 8,547,337 B2* | 10/2013 | Yoon | 345/168 |
| 8,619,043 B2* | 12/2013 | Griffin et al. | 345/173 |
| 8,726,148 B1* | 5/2014 | Battilana | 715/234 |
| 2002/0152203 A1* | 10/2002 | Ostergaard et al. | 707/3 |
| 2003/0027601 A1* | 2/2003 | Guo et al. | 455/566 |
| 2003/0165801 A1* | 9/2003 | Levy | 434/227 |
| 2003/0197736 A1* | 10/2003 | Murphy | 345/780 |
| 2005/0068323 A1* | 3/2005 | Kim | 345/467 |
| 2005/0140650 A1* | 6/2005 | Lang | 345/160 |
| 2006/0123354 A1 | 6/2006 | Volovitz | |
| 2006/0146026 A1* | 7/2006 | Shim | 345/168 |
| 2006/0165289 A1* | 7/2006 | Boss et al. | 382/182 |
| 2006/0176283 A1* | 8/2006 | Suraqui | 345/169 |
| 2006/0181435 A1* | 8/2006 | Yang | 341/22 |
| 2006/0230347 A1* | 10/2006 | Han | 715/535 |
| 2006/0247915 A1 | 11/2006 | Bradford et al. | |
| 2007/0030249 A1 | 2/2007 | Griffin et al. | |
| 2007/0061753 A1 | 3/2007 | Ng et al. | |
| 2007/0152980 A1* | 7/2007 | Kocienda et al. | 345/173 |
| 2007/0205983 A1* | 9/2007 | Naimo | 345/160 |
| 2007/0229312 A1* | 10/2007 | Park et al. | 341/22 |
| 2008/0042983 A1* | 2/2008 | Kim et al. | 345/173 |
| 2008/0072143 A1* | 3/2008 | Assadollahi | 715/261 |
| 2008/0088487 A1* | 4/2008 | Li | 341/22 |
| 2008/0122796 A1 | 5/2008 | Jobs et al. | |
| 2008/0126075 A1* | 5/2008 | Thorn | 704/3 |
| 2008/0211695 A1* | 9/2008 | Dell'Orto | 341/20 |
| 2008/0238877 A1* | 10/2008 | Fujimoto | 345/169 |
| 2008/0261660 A1* | 10/2008 | Huh et al. | 455/566 |
| 2008/0270949 A1* | 10/2008 | Liang | 715/859 |
| 2008/0316183 A1* | 12/2008 | Westerman et al. | 345/173 |
| 2009/0009367 A1* | 1/2009 | Hirshberg | 341/22 |
| 2009/0015556 A1 | 1/2009 | Kazmi | |
| 2009/0088216 A1* | 4/2009 | Pichler et al. | 455/566 |
| 2009/0225041 A1* | 9/2009 | Kida et al. | 345/173 |
| 2009/0322695 A1* | 12/2009 | Cho et al. | 345/173 |
| 2010/0031143 A1* | 2/2010 | Rao et al. | 715/261 |
| 2010/0127988 A1* | 5/2010 | Park et al. | 345/168 |
| 2010/0171700 A1* | 7/2010 | Sharan et al. | 345/161 |
| 2010/0171706 A1* | 7/2010 | Tsuruzono | 345/168 |
| 2010/0231523 A1* | 9/2010 | Chou | 345/171 |
| 2010/0266999 A1* | 10/2010 | Follansbee et al. | 434/322 |
| 2010/0292984 A1* | 11/2010 | Huang et al. | 704/9 |
| 2011/0004849 A1* | 1/2011 | Oh | 715/816 |
| 2011/0078636 A1* | 3/2011 | Jeon et al. | 715/859 |
| 2012/0326984 A1* | 12/2012 | Ghassabian | 345/168 |
| 2013/0080963 A1* | 3/2013 | Hong | 715/773 |

OTHER PUBLICATIONS

PCT International Search Report and Written Opinion, Application PCT/US2010/002273, mailed Nov. 28, 2011, 7 pages.

Tengo Product Information, available at "www.tengo.net/index.html", copyright 2006.

\* cited by examiner

METHOD AND APPARATUS FOR TEXT INPUT

FIELD OF THE INVENTION

This application is related generally to the field of text input, and more particularly to a method and apparatus for easing a user experience when entering such text in accordance with an input device including a very limited number of input choices.

BACKGROUND OF THE INVENTION

Portable mobile devices, such as mobile telephones, MP3 players and the like are becoming smaller in size, yet being asked to perform far more sophisticated functions. Indeed many may be provided with an ability to access the Internet, or other communication ability, and with a browser or other user-friendly interface program for reviewing information. These devices allow web browsing and various interactive features including social networking features and yet these devices may not, on their face, be suitable for such interactions. Chat and instant text messaging have now become an integral part of mobile communications. There is therefore a need to enable interactive text entry using various consumer electronics devices that may not be provided with a full keyboard due to a reduced size of the device.

Therefore, it would be beneficial to provide an improved text input method and apparatus that overcomes the drawbacks of the prior art.

SUMMARY OF THE INVENTION

In accordance with the present invention, a rapid text entry system and method are provided that leverage advanced and innovative error tolerant predictive text algorithms. The user can easily enter text employing a text entry device including four directional keys, a center selection button and a menu button, or the like, by way of example. Each of the four directional keys represents a range of letters, numbers, or other characters to be selected by a user. When a user indicates one of the four directional keys, the set of letters, numbers, or other symbols represented by that directional key is selected. Upon the use of the directional keys again, a second set of indicated characters is selected by the user. In this manner, the user is able to consecutively select one of four sets of such letters, numbers or other symbols. The selected sequence of letters, numbers or other symbols are then input to a predictive algorithm that determines words, for example, most likely intended by the user. In accordance with the invention various menu selection elements allow a user to select between the set of characters represented by each of the directional keys.

Preferably, the invention further provides a method of selecting from among a number of the most likely selections generated by the predictive algorithm. Entry of such a selection mode allows the user to use the same directional keys to make an appropriate choice. Thus, in accordance with the invention a user may be able to use the same minimal number of directional keys to select characters, words, and make other indications that may be desirable in accordance with the invention.

The invention is also applicable to configurations of other numbers of directional, selection and menu indications, although it is most applicable when a minimal number of such selection indicators are available.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described, making reference to the following figures in which like reference numbers refer to like elements.

Figure 1:
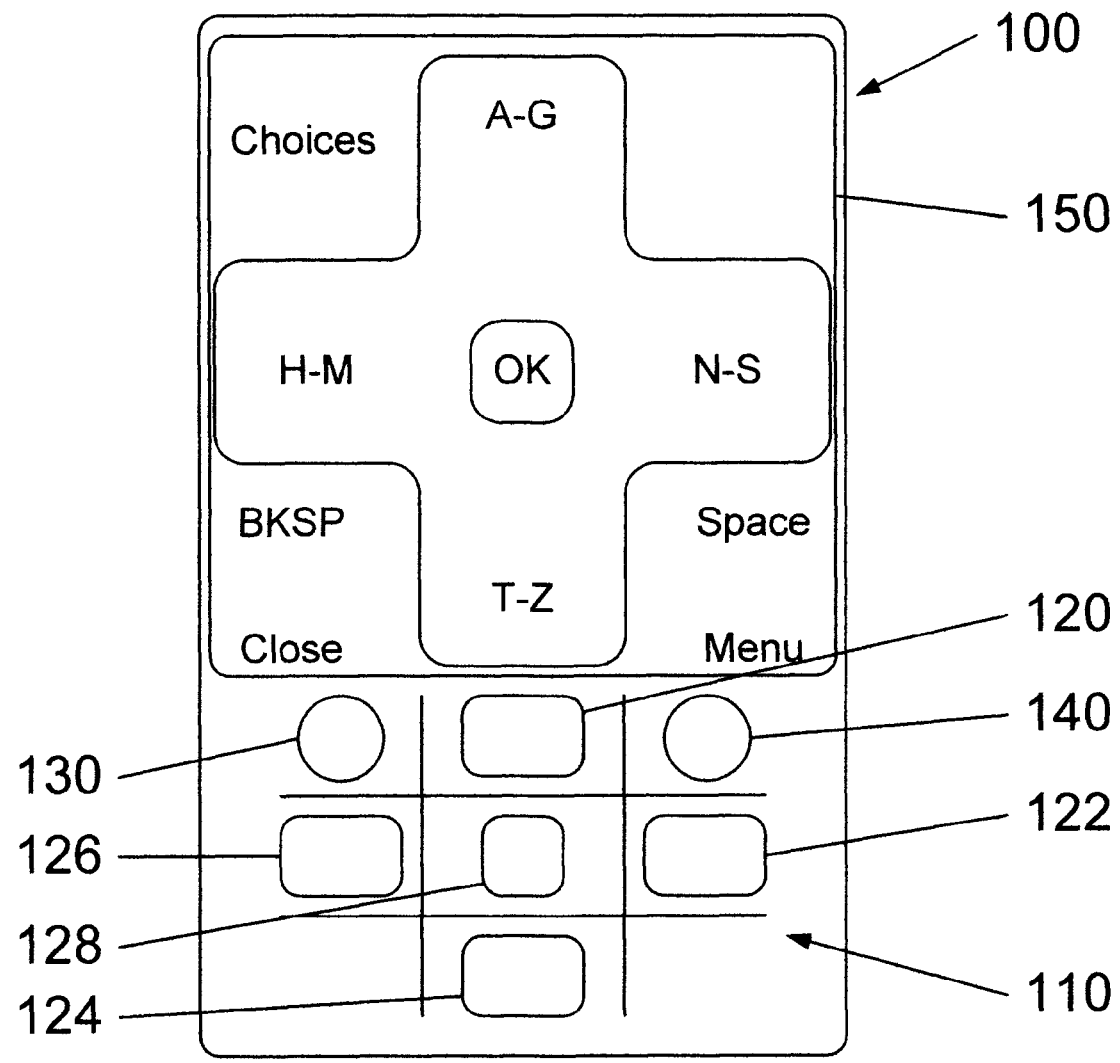
FIG. 1 depicts a representative device including directional keys, selection and menu selection keys in accordance with the invention.
Figure 2:
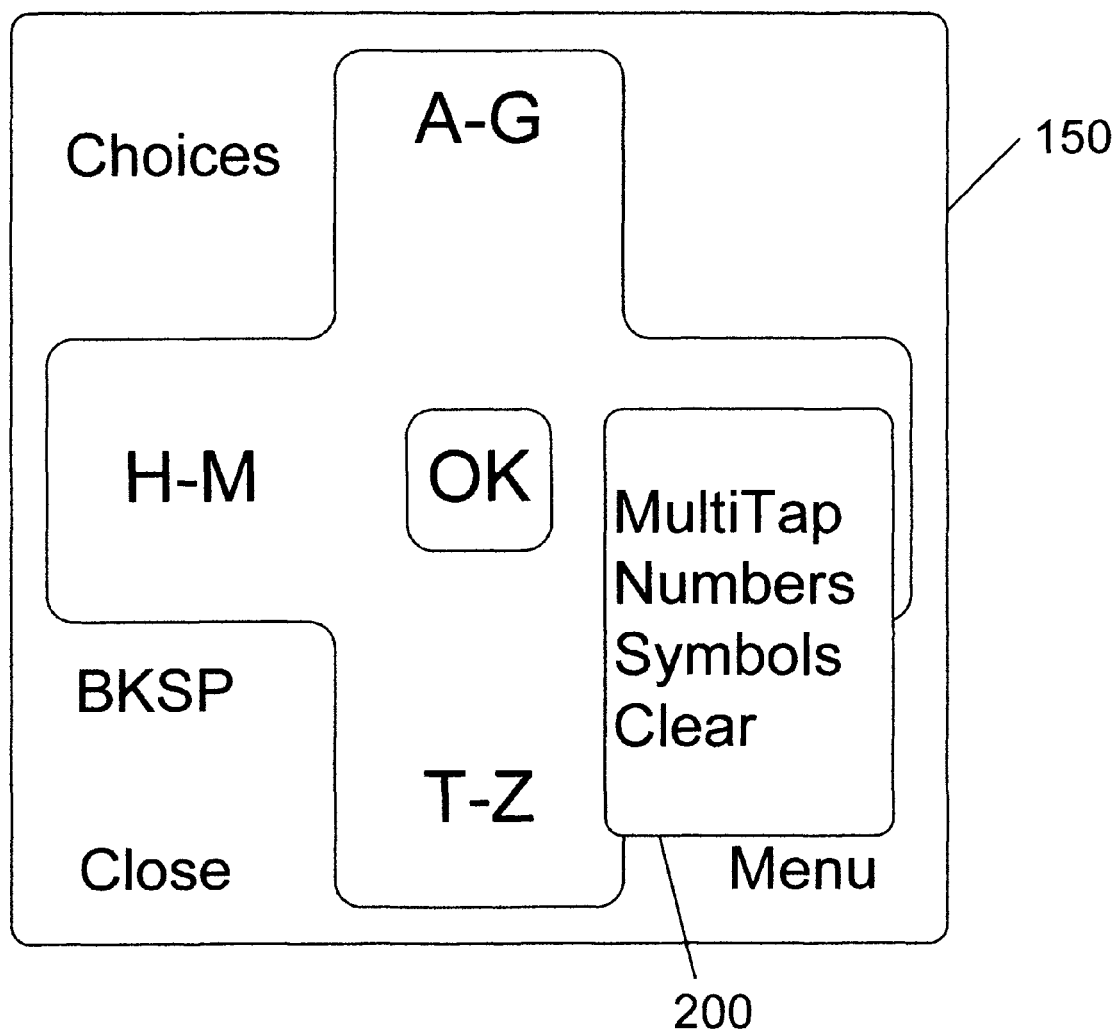
FIG. 2 depicts a menu selection provided to a user in accordance with the invention to allow the user to select between various available character sets.

Referring first to FIG. 1, a first embodiment in accordance with the invention is shown. In FIG. 1, a device 100 employing a directional key design 110 is shown. In particular, such directional key design 110 further comprises individual directional keys 120, 122, 124 and 126, and a selection button 128. Further provided are a menu selection key 130, a power button 140, and a display 150. While such keys are shown as being dedicated hardware elements of the device 100, it is contemplated in accordance with the invention that such keys may be displayed on a portion of a touch screen device, thus providing a version of such a device allowing for the ease of use described herein, but also flexibility for choosing modes of display and the like. Upon selection of menu key 130, a user is provided with a menu allowing for selection between various character sets to be represented by the directional keys 120, 122, 124 and 126. Such a menu 200 is viewed by a user on display 150 of device 100, and is shown in FIG. 2. Once menu 200 is displayed, the user may use directional keys 120 and 124 to move through the menu, and select a menu choice by the activation of selection key 128. As is shown in FIG. 2, the menu preferably includes a selection for "Multitap" representing the ability to select from groups of letter, "Numbers" to select from groups of numbers, "Symbols" to select from groups of symbols, and "Clear" to remove one or more previous entries. Upon selection of a menu choice from menu 200, display 150 changes to display alternatives in accordance with the selection.

Figure 3:
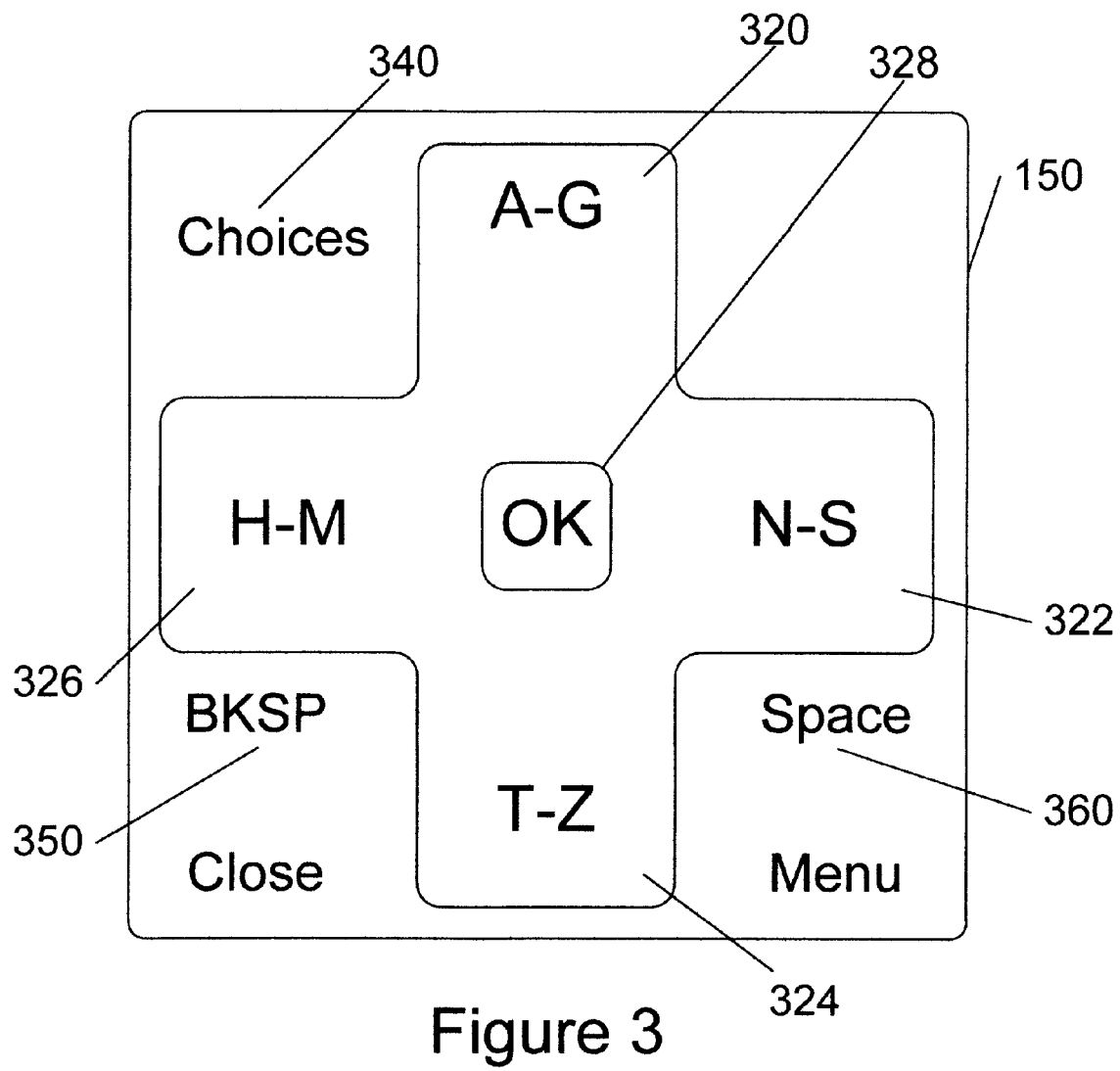
FIG. 3 depicts a set of directional keys representing selection between various ranges of letters in accordance with the invention.

Thus, by way of example, upon selection of "Multitap" from menu 200, display 150 preferably displays an image such as that shown in FIG. 3. This image preferably mimics the shape of directional key design 110, and in this case indicates that upon activation of directional key 120, letters A-G located at portion 320 of display 150 are selected, upon activation of directional key 122, letters N-S located at portion 322 of display 150 are selected, upon activation of directional key 124, letters T-Z located at portion 324 of display 150 are selected, and upon activation of directional key 126, letters H-M located at portion of 326 of display 150 are selected. When activated sequentially, the user is able to select groups of letters that encompass sequential letters from words the user is attempting to spell. In all modes, long activation of directional key 126 results in a backspace, as noted at portion 350 of display 150, and a long activation of directional key 122 results in a space.

Figure 4:
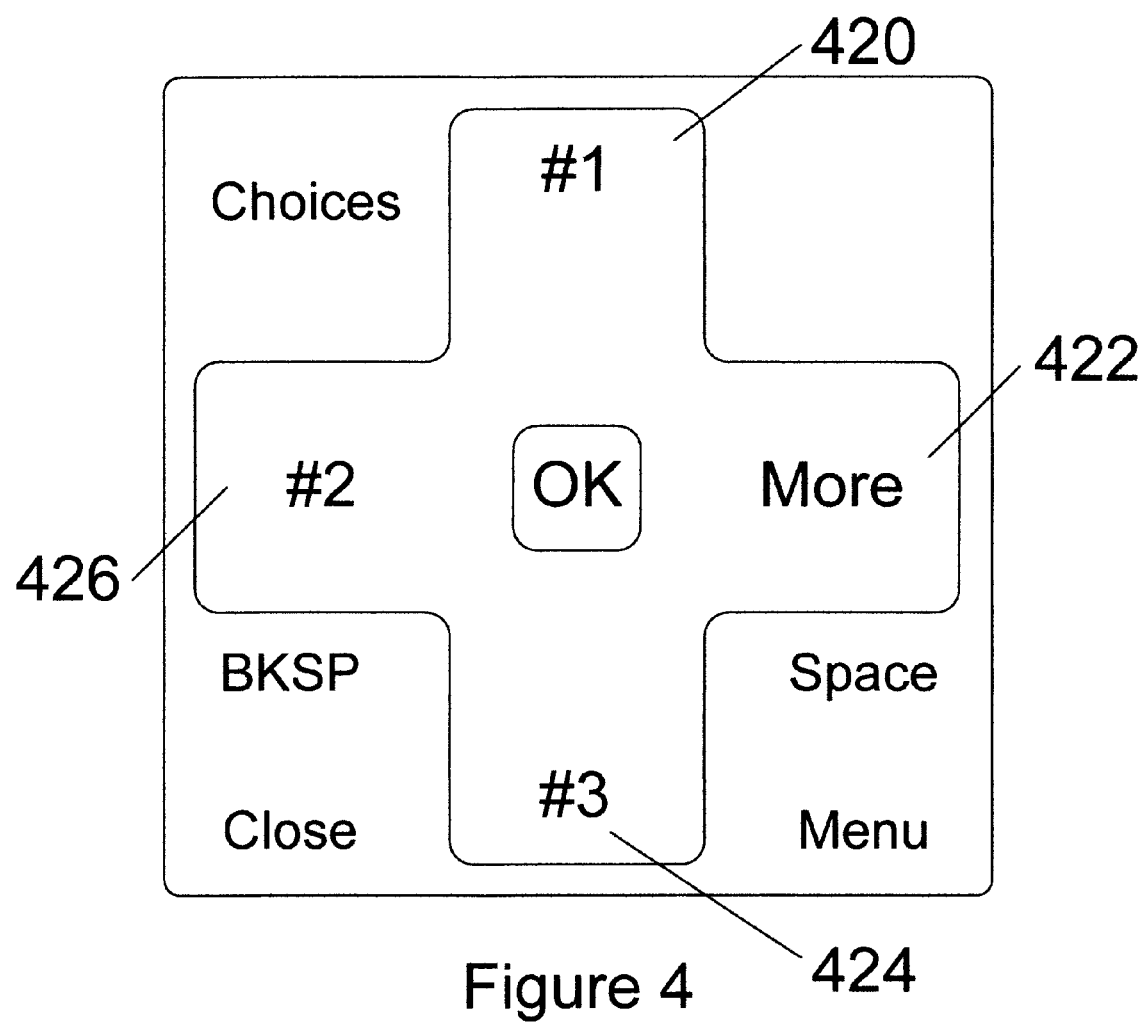
FIG. 4 depicts a set of directional keys representing selection between particular letters, numbers or symbols presented in one of the ranges of FIGS. 3, 5 and 6.

A predictive algorithm is used to determine user intended words, these words being displayed on display 150 at portion 340 thereof. Preferably, the most likely word is shown first and may be selected by the user by depressing middle selection button 128 for a short period of time. Upon depression of the middle selection button for a long period of time, the displayed word choices may populate the display 150 as shown in FIG. 4. Thus, in display portion 420, the first choice is shown, the second at portion 426, and the third at portion 424. By depressing the corresponding directional key, the displayed choice can be selected. If the user wishes to view additional choices from which to choose, the user can activate the directional key corresponding to display portion 422, thus displaying a next three suggestions.

As can be recognized by a user, each directional key represents a set of letters. Thus, any time a user is interested in selecting any one of the letters indicated by a particular directional key, the user activates the corresponding directional key and all of the letters associated with the particular directional key are selected.

As can be understood from this description, a user experience is eased as a user need not select each desired letter form a traditional keyboard, and similarly need not scroll to each letter in a displayed keyboard employing directional keys, but rather need only choose from one of four letter sets. Of course, when employing a predictive parsing algorithm that only has four inputs, determining user intent may be assumed to be a bit more difficult in that the algorithm must choose a suggested word or words only knowing consecutive groups of letters selected, and not the actual letters selected. This assumption, however, may not be correct. Indeed, when selecting among 26 keys, any determination algorithm must consider the fact that the user may make a large number of input errors. While any algorithm must parse words, and having fewer input selections would tend to make this parsing more difficult, this may be counterbalanced with the fact that a user is less likely to make errors when entering information in a system employing the directional key entry method and system in accordance with the invention.

In an alternative embodiment, rather than having four sets of letter, eight sets of letters may be provided, four requiring only one activation of the directional keys, and four requiring two activations, either in sequence or simultaneously. Thus display 150 might show four letter groups corresponding as shown in FIG. 3, and four additional letter groups displayed between the positions shown in FIG. 4.

An exemplary predictive text algorithm is depicted in, for example, co-assigned U.S. patent application Ser. No. 12/186,425 to Matthew Cecil, el al., filed Aug. 5, 2008, entitled "A PROBABILITY-BASED APPROACH TO RECOGNITION OF USER-ENTERED DATA", the entire contents thereof being incorporated herein by reference. This application describes a system that associates a probability distribution to each key on the key board, and employs predetermined probabilities of the user striking a key among the plurality of keys, given the intended key. The system described in the application further provides a number associated to each pair of keys ($\alpha,\beta$) indicating the probability that key $\beta$ will be pressed when key $\alpha$ is intended. Thus given a user entered string, one is able to associate to every dictionary word a number indicating the likelihood that the entered string would occur given the dictionary word was intended. Such an algorithm utilized in accordance with the present invention addresses the predictive text requirements of the invention. The user interface will pass the algorithm a character (or string of characters associated with a particular jumper point and zone) and the algorithm will interpret that character (or characters) and return a result to the user interface in the form of one or more suggested word selections, or may return an indication of an inability to properly parse out a word selection, indicating that the user has not yet entered enough letters as of yet. Other algorithms, in addition to that described in the '425 application may also be applied.

Of course, user context, history or the like may be employed to aid in such suggested word selection. Additionally, while the described predictive text algorithm may be employed, the present invention may be used with any appropriate text parsing or predictive text algorithm. As long as jump points can be associated with a number of different inputs, and these inputs can be differentiated from each other and used to select an intended input by a user, the invention may be employed. Furthermore, if the user is selecting from among a limited number of entries, as in a list of songs stored on an mp3 player, a list of contacts in a device, a list of stations in a satellite radio receiver, or the like, the predictive text algorithm relying on such a limited number of inputs can be made even more robust as the number of choices is greatly reduced from a general dictionary. In such a situation, the inventive text entry method of the invention may be preferable to that of a full qwerty keyboard in that a user can enter text more quickly, and because of the limited dictionary, time until recognition of user intent may not be greatly increased.

Thus, using a matrix of probabilities the algorithm knows that for each directional key pressed the user entered all letters represented by the activated directional key. Once the algorithm knows the selected characters the algorithm then runs a search against a dictionary, as is more completely described in the '425 application referenced above. Any words that match the string of selected characters are designated and then preferably scored based on distance between characters, frequency, probability, and any number of other characteristics that may be indicative of a user intention. The system can also adopt over time to give a higher probability of selection to frequently used patterns of a particular user. Thus, the prediction mechanism may be personalized for a particular user. Furthermore, in order to additionally aid in determining user intention, in accordance with the invention the predictive algorithm of the proposed system may, in addition to relying upon a traditional dictionary, attempt to further determine user intention by determining the context of a particular text input, such as determining whether the input is for an email, chat, search, or the like, or whether the text input is taking place during a particular television show, or while a music application is playing a song. To the extent a user is likely to use different words and/or other language differences, such context determination may aid in the accuracy of the predictive text algorithm. The algorithm may also receive information about information from stored content, the content of one or more databases, such as a user's contact list or the like, to improve the reliability of the prediction. Such context may be stored within a device being used for text entry, or may be stored remotely in a database accessible over the Internet, or other available network. The list of words is then sorted based on that score and returned to the user interface. Thus, the invention uses the redundancy in the input language or the possible input functionalities to map approximate input into non-ambiguous input per the user intention. Additionally, device features and functionality may be considered when determining user input, thus perhaps taking into account device limitations when determining such input.

Figure 5:
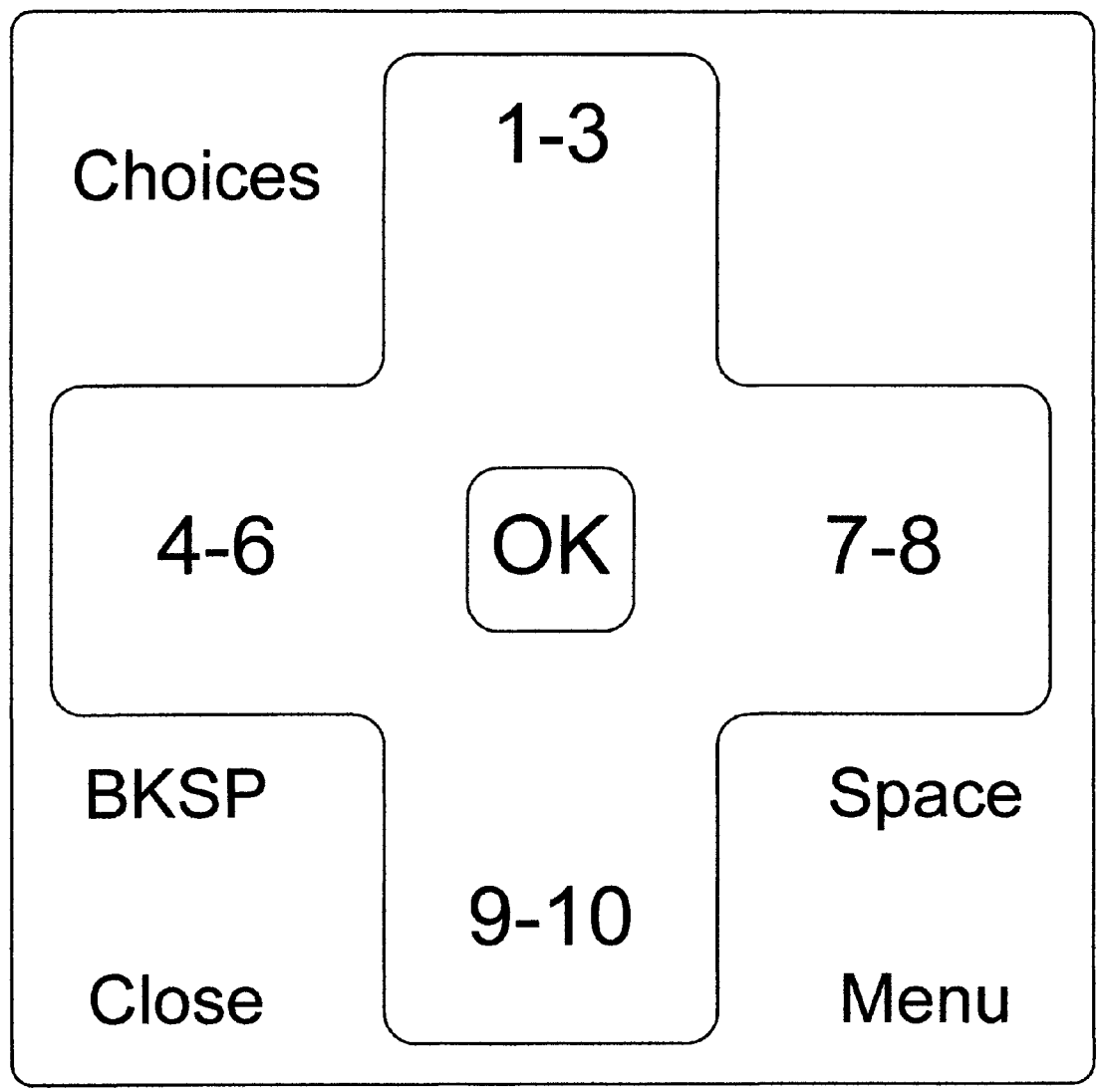
FIG. 5 depicts a set of directional keys representing selection between various ranges of numbers in accordance with the invention.
Figure 6:
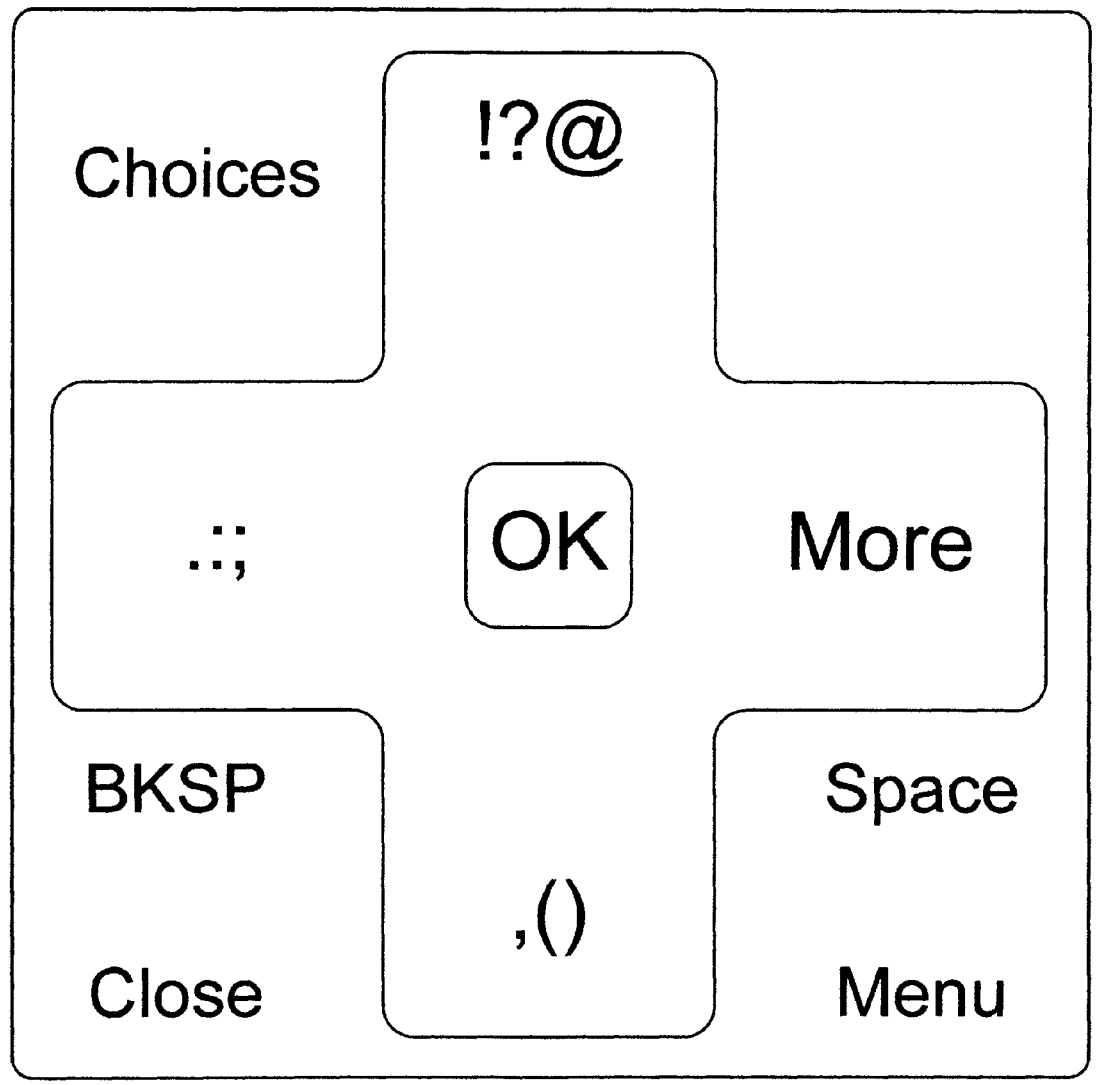
FIG. 6 depicts a set of directional keys representing selection between various ranges of symbols in accordance with the invention.

Referring once again to FIG. 2, when one of the other selections is made from menu 200, display 150 displays corresponding information to the selection. Thus, upon selection of "Numbers" from menu 200, display 150 preferably displays information such as that shown in FIG. 5. Functioning of selecting the groups of numbers is similar to that of selecting numbers in FIG. 3. Upon selection of one group of letters, a display such as that shown in FIG. 4, each of the group of numbers being selectable by use of the corresponding directional keys. Upon selection of the "Symbols" choice from menu 200, the display as shown in FIG. 6 is employed. Selection of the symbols in accordance with the sequences noted above and with respect to FIG. 4 are employed.

It is also contemplated that a user may enter a direct letter selection mode in which a user is shown a sequence of letters, and can employ the directional keys to highlight one of the letters, and select the letter by use of the center selection key 128. Such entry may be desirable when entering a name or uncommon word. When such direct letter entry is employed, the predictive algorithm may or may not be employed.

While the invention has been described making reference to a four directional key implementation, any number of directional keys may be employed, including as few as two.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A text entry apparatus, comprising:
a keypad comprising four directional keys;
a display device; and
a parsing algorithm for determining a user intended text input based upon a received sequence of directional keys;
wherein eight sets of characters are defined, each set comprising at least two characters;
wherein a different two sets of the eight sets of characters are simultaneously assigned to each of the four directional keys,
wherein a first individual actuation of a directional key selects all of the characters from one of the sets assigned thereto for the parsing algorithm; and
a second consecutive individual actuation of the same directional key selects all of the characters from the other set assigned thereto for the parsing algorithm;
wherein the parsing algorithm determines the user intended text input using a predetermined probability distribution that indicates, for one or more character set selections possible using the keypad, a probability that a user unintentionally performed a received actuation when the user intended to perform a different intended actuation;
wherein the parsing algorithm further determines the user intended text input by:
determining a context of the text entry apparatus comprising a set of elements including one or more of: a set of songs, a set of contacts, or a set of stations; and
limiting possible user intended text inputs to the set of elements;
wherein, concurrently with the first individual actuation or the second consecutive individual actuation, the display device is configured to display, for each of the four directional keys, simultaneous indications of the different two sets of characters assigned to that directional key; and
wherein the sum of the characters in the four sets of characters that correspond to the first individual actuation of each of the four directional keys comprise all the characters in an alphabet.

2. The text entry apparatus of claim 1, wherein the keypad is a touchscreen that displays directional keys.

3. The text entry apparatus of claim 1, wherein the display is further configured to display a most likely intended word of the user, as determined in accordance with the parsing algorithm.

4. The text entry apparatus of claim 3, wherein actuation of a center selection key selects the displayed most likely intended word.

5. The text entry apparatus of claim 3, wherein an actuation of a center selection key for a period of time greater than a threshold displays the one or more of the most likely intended words as determined in accordance with the parsing algorithm.

6. The text entry apparatus of claim 1, wherein the keypad comprises dedicated hardware keys.

7. The text entry apparatus of claim 1, wherein the keypad comprises virtual keys.

8. A text entry apparatus, comprising:
a keypad comprising four directional keys and a menu selection key; and
a display;
wherein actuation of the menu selection key allows for selection of a type of character to be entered by a user;
wherein, upon selection of text entry in accordance with the menu selection key, two sets of characters are simultaneously assigned to each of the four directional keys, each set of characters assigned to the four directional keys comprising two or more characters each;
wherein each letter of an alphabet is assigned to a directional key,
wherein a first individual actuation of any of the four directional keys selects all of the characters from one set of characters assigned thereto, the selected characters provided to a parsing algorithm for determining a user intended text input based upon a received sequence of directional keys;
wherein a second consecutive individual actuation of any of the four directional keys selects all of the characters from the other set of characters assigned thereto, the selected characters provided to the parsing algorithm for determining the user intended text input based upon the received sequence of directional keys;

wherein the parsing algorithm determines the user intended text input using a predetermined probability distribution that indicates, for one or more character set selections possible using the keypad, a probability that a user unintentionally performed a received actuation when the user intended to perform a different intended actuation;

wherein the parsing algorithm further determines the user intended text input by:
 determining a context of the text entry apparatus comprising a set of elements including one or more of: a set of songs, a set of contacts, or a set of stations; and
 limiting possible user intended text inputs to the set of elements;

wherein, concurrently with the first individual actuation or the second consecutive individual actuation, the display device is configured to display, for each of the four directional keys, simultaneous indications of the two sets of characters assigned to that directional key;

wherein upon selection of numbers in accordance with the menu selection key, a set of numbers is assigned to each of the four directional keys; and wherein upon selection of symbols in accordance with the menu selection key, a set of symbols is assigned to each of the four directional keys.

9. The text entry apparatus of claim 8, wherein the display is further configured to display a most likely intended word of the user, as determined in accordance with the parsing algorithm, when the user has selected text entry.

10. The text entry apparatus of claim 9, wherein actuation of a center selection key selects the displayed most likely intended word, and wherein the keypad is a touchscreen that displays directional keys.

11. The text entry apparatus of claim 9, wherein an actuation of a center selection key for a period of time longer than a threshold displays the one or more of the most likely intended words as determined in accordance with the parsing algorithm.

12. A method for text entry, comprising:
 assigning, to each of four directional keys of a keypad, a different two sets of characters such that each directional key is simultaneously assigned two sets of characters, wherein each set of characters assigned to the four directional keys comprise two or more characters, and
 receiving a sequence of indications of a character set, each indication of a character set comprising either a first individual actuation of a directional key or a second of two individual actuations of the directional key;
  wherein the first individual actuation of the directional key selects, as a selected set, all of the characters from one set of characters assigned thereto; and
  wherein the second individual actuation of the directional key selects, as the selected set, all of the characters from the other set of characters assigned thereto;
 concurrently with receiving at least one of the indications of the character sets in the sequence, displaying, for each of the four directional keys, simultaneous indications of the two sets of characters assigned to that directional key;
 sequentially passing the selected sets of characters to a parsing algorithm that:
  determines a user intended text input using a predetermined probability distribution that indicates, for one or more character set selections possible using the keypad, a probability that a user unintentionally performed a received actuation when the user intended to perform a different intended actuation;
  determines a context of the text entry apparatus comprising a set of elements including one or more of: a set of songs, a set of contacts, or a set of stations; and
  limits possible user intended text inputs to the set of elements; and
 receiving, from the parsing algorithm, the determined user intended text input based upon the passed sets of characters.

13. The method of claim 12, further comprising displaying a most likely intended word of the user, as determined in accordance with the parsing algorithm.

14. The method of claim 13, wherein actuation of the selection key selects the displayed most likely intended word, and wherein determining a user intended text input includes employing a predictive text algorithm.

15. The method of claim 12,
 wherein space and backspace characters are assigned individual actuations of particular directional keys that exceed a duration;
 wherein individual actuation of any of the four directional keys for no more than the duration passes all of the characters, from the set of characters assigned thereto, to the parsing algorithm;
 wherein individual actuation longer than the duration of a particular directional key passes the space or backspace character assigned thereto to the parsing algorithm; and
 wherein the individual actuation for longer than the duration is performed in a single step.

16. The method of claim 13, further comprising displaying an array or sequence of characters, and receiving input via the directional keys to highlight and select multiple displayed characters.

17. The method of claim 13 wherein determining the user intended text input includes employing a predictive text algorithm.

18. The apparatus of claim 8 wherein the text entry apparatus can be switched to a direct character selection mode that displays multiple characters and the directional keys are employed to highlight and select the displayed characters.

19. The apparatus of claim 8 further comprising a memory including a predictive text algorithm configured to determine the user intended text input based upon the received sequence of directional keys.

20. The text entry apparatus of claim 1,
 wherein the display is configured to show a menu configured to receive a selection from the user; and
 wherein, in response to the selection received in the menu, an alternate set of characters is assigned to one of the directional keys instead of the first set of characters assigned thereto.

21. The text entry apparatus of claim 20,
 wherein the selection received in the menu indicates a type comprising one of letters, numbers, and symbols, and
 wherein a type of characters in the alternate set of characters corresponds to the indicated type.

22. The text entry apparatus of claim 8,
 wherein space and backspace characters are assigned to individual actuations of particular directional keys that exceed a duration;

wherein individual actuation of any of the four directional keys for no more than the duration passes all of the characters, from the set of characters assigned thereto, to the parsing algorithm;

wherein individual actuation longer than the duration of a particular directional key passes the space or backspace character assigned thereto to the parsing algorithm; and wherein the individual actuation for longer than the duration is performed in a single step.

* * * * *